(12) United States Patent
Schmidt

(10) Patent No.: US 8,421,273 B2
(45) Date of Patent: Apr. 16, 2013

(54) ELECTRICAL LOAD, SYSTEM AND METHOD

(75) Inventor: Josef Schmidt, Graben-Neudorf (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 421 days.

(21) Appl. No.: 12/514,774

(22) PCT Filed: Nov. 7, 2007

(86) PCT No.: PCT/EP2007/009638
§ 371 (c)(1),
(2), (4) Date: May 13, 2009

(87) PCT Pub. No.: WO2008/058662
PCT Pub. Date: May 22, 2008

(65) Prior Publication Data
US 2010/0066167 A1    Mar. 18, 2010

(30) Foreign Application Priority Data

Nov. 13, 2006  (DE) .......................... 10 2006 053 682

(51) Int. Cl.
*H01F 27/42* (2006.01)
*H01F 37/00* (2006.01)
*H01F 38/00* (2006.01)

(52) U.S. Cl.
USPC ............................. 307/104; 320/108; 320/109

(58) Field of Classification Search .................... 307/104
See application file for complete search history.

(56) References Cited

U.S. PATENT DOCUMENTS

| | | | | |
|---|---|---|---|---|
| 2,292,203 A * | 8/1942 | Cowin | ............................ | 290/17 |
| 4,956,545 A * | 9/1990 | Ohnmacht et al. | ............ | 219/541 |
| 5,684,380 A * | 11/1997 | Woody et al. | ................. | 320/108 |
| 5,691,878 A * | 11/1997 | Ahn et al. | ...................... | 361/674 |
| 5,711,558 A * | 1/1998 | Woody | ............................ | 292/335 |
| 5,850,135 A * | 12/1998 | Kuki et al. | ..................... | 320/108 |
| 6,310,291 B1 * | 10/2001 | Clough | ........................... | 174/67 |
| 6,316,910 B1 * | 11/2001 | Kajiura | .......................... | 320/108 |
| 6,356,052 B2 * | 3/2002 | Koike | ............................ | 320/108 |
| 6,656,639 B1 * | 12/2003 | Hagg et al. | ..................... | 429/234 |
| 7,750,506 B2 * | 7/2010 | Simon et al. | ................... | 307/104 |
| 7,922,859 B2 * | 4/2011 | Rosenberger | .............. | 156/272.8 |
| 2001/0035734 A1 | 11/2001 | Koike et al. | | |
| 2002/0125244 A1* | 9/2002 | Yokozeki et al. | .............. | 219/619 |
| 2002/0149954 A1* | 10/2002 | Besnier et al. | ................ | 363/123 |
| 2003/0094322 A1* | 5/2003 | Bowen | .......................... | 180/65.6 |
| 2003/0232138 A1* | 12/2003 | Tuominen et al. | .......... | 427/248.1 |
| 2005/0101719 A1* | 5/2005 | Ishihara | ........................ | 524/495 |

(Continued)

FOREIGN PATENT DOCUMENTS

| | | |
|---|---|---|
| DE | 103 60 599 | 7/2005 |
| DE | 103 60 604 | 7/2005 |
| DE | 10 2005 022367 | 11/2006 |
| WO | 94/09544 | 4/1994 |

OTHER PUBLICATIONS

International Search Report dated May 8, 2008, International Appln. No. PCT/EP2007/009638, filed Nov. 7, 2007.
Written Opinion of the International Searching Authority, International Appln. No. PCT/EP2007/009638, filed Nov. 7, 2007.

(Continued)

*Primary Examiner* — Rexford Barnie
*Assistant Examiner* — Toan Vu
(74) *Attorney, Agent, or Firm* — Kenyon & Kenyon LLP

(57) ABSTRACT

A load includes a device for its inductive power supply, the device including an insertion part, the power supply of the load being provided after the insertion part is inserted into the load.

58 Claims, 7 Drawing Sheets

U.S. PATENT DOCUMENTS

| | | | |
|---|---|---|---|
| 2005/0242775 A1* | 11/2005 | Miyazaki et al. | 320/116 |
| 2006/0124280 A1* | 6/2006 | Lee et al. | 165/104.26 |
| 2006/0125333 A1* | 6/2006 | Wehner et al. | 310/54 |
| 2006/0152085 A1* | 7/2006 | Flett et al. | 307/75 |
| 2006/0250902 A1* | 11/2006 | Bender et al. | 369/1 |
| 2007/0145936 A1 | 6/2007 | Simon et al. | |
| 2008/0122294 A1 | 5/2008 | Simon et al. | |
| 2009/0102284 A1 | 4/2009 | Schmidt | |

OTHER PUBLICATIONS

MOVIGEAR, the Mechatronic Drive System, Product Announcement, Apr. 2006.

International Preliminary Report on Patentability dated Jun. 10, 2009, International Appln. No. PCT/EP2007/009638, filed Nov. 7, 2007.

* cited by examiner

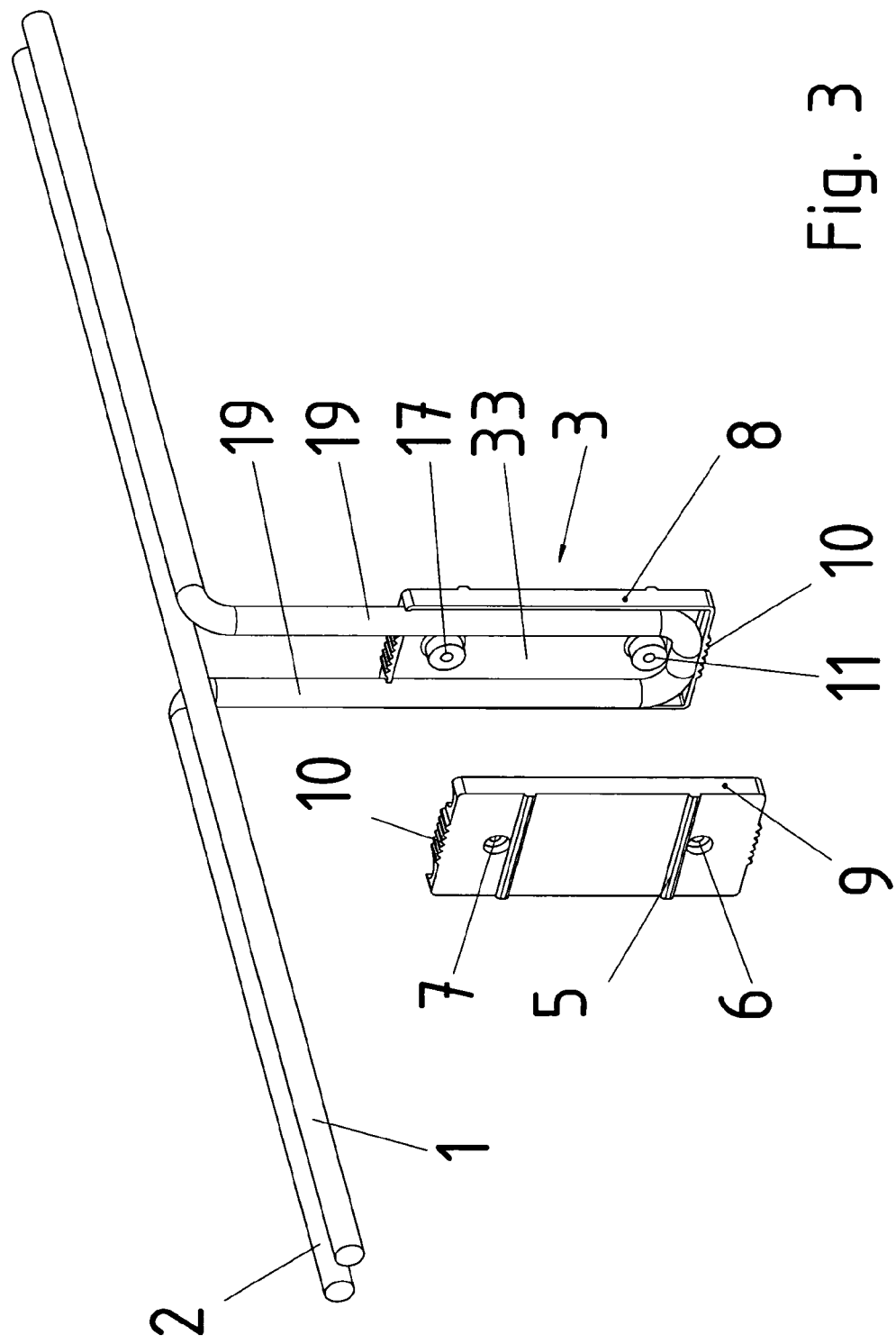

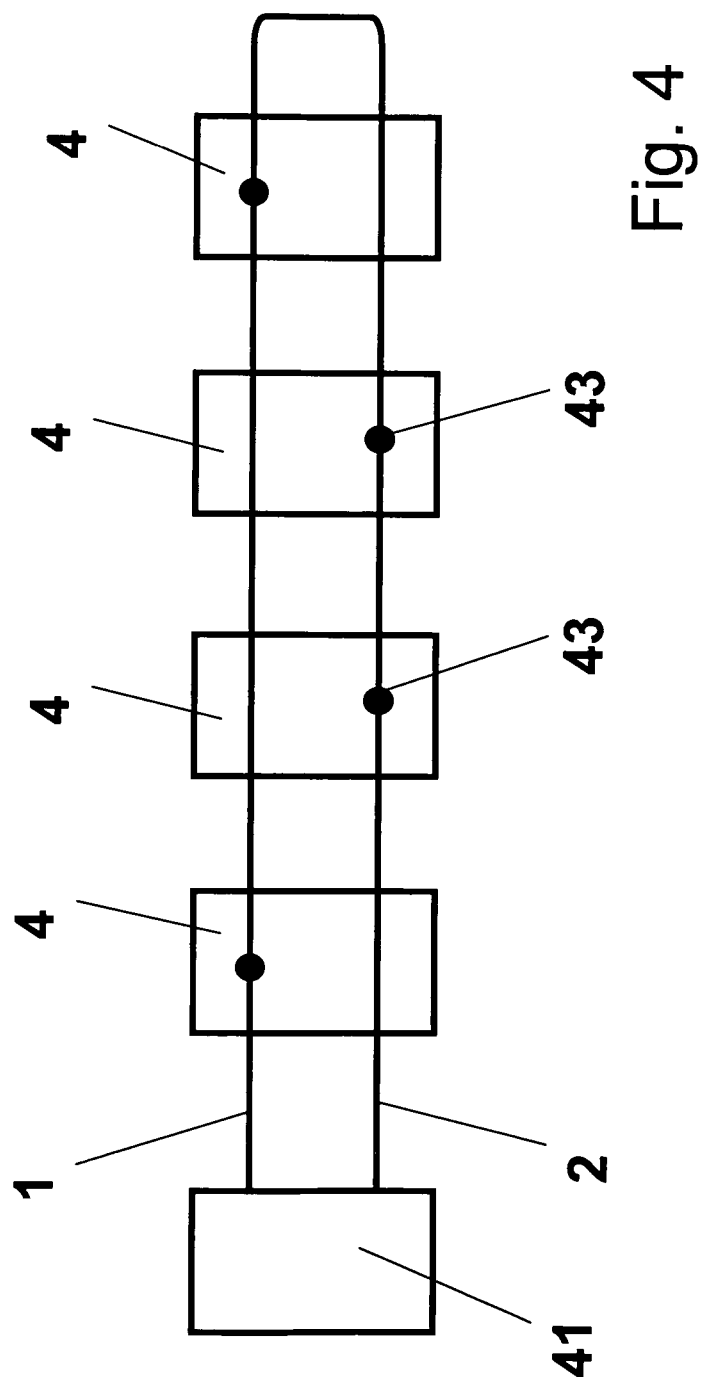

ELECTRICAL LOAD, SYSTEM AND METHOD

FIELD OF THE INVENTION

The present invention relates to an electrical load, a system and a method.

BACKGROUND INFORMATION

In industrial plants, it is known that electrical loads, such as electronic devices, lighting devices, drives, machines, and the like can be powered galvanically from a network, in particular using alternating current at 50 or 60 Hz. To this end, the loads are for the most part mechanically attached and electrically connected by expensive plug-and-socket connectors. In addition, most of such systems or machines have a T-piece for each drive unit as an power branch. These T-pieces are difficult to install and expensive, in particular when they must be usable and provide a high degree of protection in wet areas or even aseptic areas. These T-pieces are also referred to as distribution boxes and often include additional device parts as well, such as emergency-off switches. Therefore, they are complicated and expensive, especially with regard to installation as well.

German Published Patent Application No. 103 60 604 describes a system and a load for a contactless power supply.

SUMMARY

Example embodiments of the present invention provide simpler and more cost-effective wiring in electrical loads and systems.

Among features of example embodiments of the present invention in terms of the electrical load are that it includes device(s) for its inductive power supply from the primary conductor, the device(s) including an insertion part, which is detachably connected to the load, the insertion part having means for the non-destructive, detachable accommodation of a section of the primary conductor. The advantage of this is that the inductive power supply may be provided quickly, simply and without costly plug connectors. In particular, a section of the primary conductor may be used non-destructively as the tapping point for the inductive power supply. The insertion part may thus be removed from the primary conductor without traces of the tapping remaining on the primary conductor.

In terms of the electrical load, among features of example embodiments of the present invention are alternatively or additionally that it includes a housing part having the function of forming a housing for an electric motor, a gear unit and an electronic circuit powering the electric motor, the rotor shaft of the electric motor and the drive shaft of the gear unit being supported in the housing part, in particular in the same, and a receiving region being provided, which includes a secondary winding for a contactless supply of power, in particular in weak coupling in resonance, an insertion part being insertable into the receiving region, which embraces a primary conductor at least partially, the inductive coupling between the primary conductor and the secondary winding being able to be produced by inserting the insertion part. This allows for a quick connection to and disconnection from the powering system. It is not necessary to use exposed electrical contacts. In addition, the insertion part made of plastic is inexpensive to manufacture.

In this instance, the device(s) for the inductive power supply include a secondary coil coupled inductively to a primary conductor system, which secondary coil, in particular for forming an oscillating circuit, is connected to a capacitor in series or in parallel such that the associated resonant frequency corresponds substantially to the medium-frequency alternating current frequency of the primary current. It is advantageous in this respect that the current in the secondary coil has two components. A first component is the transformed current component known in transformers. Added to this is a resonant current component that is produced by the oscillating circuit system. The secondary coil is connected in series and/or in parallel to at least one capacitor such that the resonant frequency corresponds substantially to the medium frequency. In this manner, a high efficiency in transmission is ensured even in the case of a weak inductive coupling, which occurs for example when there is a large air gap between the primary conductor and the secondary conductor. The oscillating circuit system allows for power to be transmitted across a large air gap. A substantially constant medium-frequency alternating current is injected into the primary conductor, in particular by a current regulation that is substantially independent of the power drawn by the loads. In example embodiments, the device(s) for the inductive supply of power include one or more capacitors, which is or are connected in series and/or in parallel to a secondary coil supplying the load such that the corresponding resonant frequency substantially corresponds to the medium frequency. It is advantageous in this regard that a large air gap is feasible between the primary conductor and the secondary coil. Because of the adjustment to the resonant frequency, a ferromagnetic core for transmitting the magnetic field produced by the primary conductor to the secondary coil may be omitted. In summary, the described type of contactless power transmission is called a power supply in weak coupling in resonance.

The primary conductor is preferably supplied by an alternating current having a substantially constant amplitude of 10 A or 60 A or above and a frequency of 10 kHz or above, for example 100 kHz.

An advantage of example embodiments of the present invention is that it makes it possible for the load to be manufactured in a cost-effective manner to be impervious and to provide a high degree of protection. The contactless powering of the load allows for the housing to be manufactured simply and easily, in particular without uneven areas or plug-and-socket connectors, and thus to let water drain off and prevent solids from settling. The load is therefore particularly usable in wet areas and aseptic areas. Example embodiments of the present invention make it possible to reduce the time required for wiring. In addition, leakage currents that occur in conventional plug-and-socket wiring are prevented, which results in an improved electromagnetic compatibility.

It is also advantageous that the power supply to the loads is voltageless, and that the carrying-over of voltage otherwise present in systems, as well as spark-suppression devices in disconnecting switches, may be eliminated. In addition, reactive-power compensation is made possible, in particular in the load, and therefore the alternating current has smaller values, which is why smaller wire diameters may be provided in the primary conductor and lower wiring costs are therefore attainable. Disconnecting switches may be eliminated, since interruption may be replaced by extraction of the primary conductor.

In example embodiments, a recess is formed on the housing of the load, the detachable connection of the insertion part to the load being established by inserting the insertion part into the recess. It is advantageous in this regard that a simple option is provided for connecting the load to a power supply. A switch and a plug-and-socket connector may thus be omitted.

In example embodiments, the insertion part and the primary conductor may be detachably connected, and/or the insertion part may be connected to the load in a form-locking or force-locking manner, in particular by a clamping connection, in particular after insertion into a recess. Advantageously, the load may thus be connected quickly, and the insertion part is at least partially shielded by the housing of the load and protected against damage.

In example embodiments, the insertion part forms a housing for the primary conductor at least partially, in particular sectionally. In example embodiments, the insertion part may be opened and closed, in particular for putting in and taking out the primary conductor. Thus the connection between the primary conductor and the insertion part may be established advantageously, and the insertion part protects the primary conductor during the insertion and in a simple manner establishes a defined distance between the primary conductor in the insertion part and the load such that the contactless supply of power to the load may occur under defined conditions, in particular with respect to the geometry and the material properties on the tap.

In example embodiments, the section of the primary conductor for the inductive power supply is shiftable by merely opening, repositioning and closing the insertion part. The shift advantageously takes place along the primary conductor. It is advantageous in this regard that the section of the primary conductor may be used non-destructively for connecting the load, in particular that the insulation of the primary conductor is not destroyed in the connection. This makes it possible to reposition the insertion part. Thus a new load may be readily integrated into an existing power supply network, and a load may be readily removed from an existing power supply network. A load is also readily shiftable, in that the tap required for its power supply is provided at another point and/or in another section of the primary conductor.

In example embodiments, the insertion part includes at least two subsections that are connectable in a detachable manner. In example embodiments, the two subsections are configured variably in their relative spatial position with respect to each other, in particular foldable and/or rotatable and/or shiftable. Thus the insertion part is particularly simple to manufacture, and the opening and closing and the establishment of the housing-forming function of the insertion part may be achieved in a particularly simple manner. In an alternative, the insertion part includes at least two subsections that are connected via a bendable or foldable transition section or a hinge so as to allow flapping or folding. These two subsections having the transition section are executed in one piece in the alternative.

In example embodiments, the primary conductor is electrically insulated against the load. In example embodiments, the insertion part is made by injection molding, in particular plastic injection molding. The advantage in this regard is that no electrical contacts are accessible and that a high robustness against dust, dirt and moisture with respect to environmental influences may be achieved.

In example embodiments, the insertion part is made of heat-conducting plastic, in particular of a polymer matrix material having a fibrous and/or a non-fibrous heat-conducting filler. Thus favorable conditions are achieved for cooling the insertion part. The waste heat produced by the inductive coupling, in particular by medium-frequency magnetic reversals, may be dissipated via the insertion part outwards to the environment or to a cooling surface. A polyethylene fiber, a polypropylene fiber, a polyester fiber, a polyallyl sulfide fiber, an aramide fiber, a polyamide fiber and/or a carbon fiber may be used as heat-conducting fiber, for example. A directed cooling may be advantageously effected by the fiber shape. Preferably a filler having a spherical or other irregular shape, which is not produced by grinding up fibers, may be used as non-fibrous filler. Filler made of aluminum oxide, boron nitride, aluminum nitride, silicon carbide and/or silicon dioxide may be used for example. The combination of fibrous and non-fibrous fillers achieves a particularly good thermal conductivity, while offering favorable molding properties of the plastic material.

In example embodiments, a lock, including shackle, may be attached to the insertion part in a form-locking manner, a key being required for detaching the lock from the insertion part. In particular, a bore is provided on the insertion part for the shackle of the lock. Advantageously, only a deliberate and authorized removal of the power supply from the load is possible. Releasing the lock involves in particular opening the lock and removing the opened lock.

In example embodiments, the insertion part is connectable to the load by device(s) requiring the use of a tool. Advantageously, only a deliberate and authorized removal of the power supply from the load is possible. For example, bolts and/or nuts having a special, non-standard formation of the tool receptacle for operating the bolt and/or the nut may be used advantageously as such device(s).

In example embodiments, a primary conductor is provided on the load such that an inductive coupling to a secondary winding contained in the load is established. In this context, it is advantageous that no plug-and-socket connector is required, and that the wiring may therefore be carried out in a simple and rapid manner. In addition, it is possible to reduce costs. Since it is not necessary to precut the cable and fit it with connectors, the installation may also be carried out by personnel not trained in electrical technology.

In example embodiments, at least one primary conductor is provided in a groove or a cable duct of the load. In this context, it is advantageous that the cable may be laid very simply and rapidly, namely by merely pressing it into the groove or the cable duct. In addition, encapsulation by an encapsulating material may be advantageously implemented.

In example embodiments, the device(s) for the inductive power supply include an electronic circuit, in particular including a resonant oscillating circuit, for supplying power to parts of the load. It is advantageous in this regard that the housing additionally forms a housing for the electronic circuit for supplying power to parts of the load.

In example embodiments, the device(s) for the inductive power supply include a secondary winding, which is situated in the housing of the load. This makes it possible to supply power to the load through the housing wall without a perforation or other opening, and the load may be sealed so as to offer a high degree of protection.

In example embodiments, the secondary winding is wound around a ferromagnetic core, the ferromagnetic core having legs that partially embrace the recess in the housing of the load. The ferromagnetic core, which may also be developed in one piece with a housing part, advantageously reinforces the inductive coupling. Because of the fact that the ferromagnetic core at least partially embraces the recess, the active surface for coupling the primary conductor situated in the recess to the secondary winding is particularly large. This additionally increases the strength of the coupling and thus the efficiency.

In example embodiments, the ferromagnetic core of the secondary winding partially forms a housing for the load.

Thus material is conserved on the one hand, while on the other hand a contact surface is formed for an improved coupling of the primary conductor.

In example embodiments, the load is a drive that includes at least one electric motor and an electronic circuit for powering and/or controlling and/or regulating the electric motor. It is advantageous in this regard that example embodiments of the present invention may be used in drive technology, particularly in applications for which there are special requirements regarding the imperviousness of housings, for example in the food industry or in use under adverse weather conditions, or for the special requirements with respect to explosion protection. For the present invention obviates plug-and-socket connections and friction contacts and switches.

In example embodiments, the load has a housing part, which has the function of forming a housing for an electric motor, a gear unit and an electronic circuit, including frequency converter, powering the electric motor, the rotor shaft of the electric motor and the drive shaft of the gear unit being supported in the housing part and the insertion part being insertable into a receiving region of the housing part.

Advantageously, a housing part is thus formed that unites multiple functions. The housing thus forms a housing for various components of the drive and accommodates the power supply.

In example embodiments, at least one secondary winding is wound around a U-shaped and/or E-shaped core or integrated into a very shallow receiving head. In this context, it is advantageous that the design may be selected as a function of the utilized method, desired power output and/or desired efficiency and/or desired structural dimensions.

In example embodiments, the primary conductors are at least partially encapsulated and/or protected by a cover. In this context, it is advantageous that an especially high degree of protection is attainable, and that no cavities are produced which are at risk of being soiled. Such conductor parts encapsulated in a cover or holder may be mounted on a smooth housing surface of the load such that it is not necessary to provide a groove or duct on the load.

In example embodiments, the load is impervious, smooth on the outer surface, and/or manufactured to have a high degree of protection. In this context, it is advantageous that the load may be provided, in particular, for use in wet areas and/or aseptic areas.

In example embodiments, the load does not include a plug-and-socket connector or other electrical connection terminals on its exterior. In this context, it is, in turn, advantageous that the load may be easily manufactured to be impervious and to provide a high degree of protection.

In example embodiments, the insertion part includes a guide device, by which the inserted primary conductor is guided. It is advantageous in this regard that the primary conductor, especially the section of the primary conductor effecting the inductive coupling, is fixated in or on the insertion part. This ensures the relative position of the primary conductor with respect to the load, in particular with respect to the secondary winding. Thus defined coupling conditions are achieved, and an overdimensioning of the power output offered on the primary conductor is dispensable.

In example embodiments, a ferromagnetic region is developed on the insertion part or the insertion part contains a ferromagnetic core. Thus the coupling is reinforced and consequently the efficiency of the power supply is increased.

In example embodiments, the ferromagnetic core is detachably connected to the insertion part. Thus a core may be provided depending on the application, or an inexpensive core may be subsequently exchanged against a high-grade material.

In example embodiments, the ferromagnetic core is cast in the insertion part. A particularly robust insertion part is thus provided.

In example embodiments, the ferromagnetic core partially forms a housing for the insertion part and/or a region of the ferromagnetic core forms an outer surface of the insertion part. Thus material may be conserved on the one hand, while on the other hand a contact surface is formed, to which a secondary-side core may be connected by direct contact. Scattering losses are thus minimized.

In example embodiments, the primary conductor inserted into the insertion part forms at least one loop or winding, the ferromagnetic core of the secondary winding covering the loop or winding. Thus the magnetic flow lines generated by the current flow in the primary conductor are taken up by the core of the secondary winding and conducted through the secondary winding. Scattering losses are advantageously minimized.

In example embodiments, the primary conductor inserted into the insertion part forms at least one loop or winding, which bounds an area, the ferromagnetic region or the ferromagnetic core being situated in this area. Thus the magnetic field generated by the current flow in the primary conductor is amplified. The efficiency of the power supply is thereby advantageously increased.

In example embodiments, the recess is partially formed by regions in the housing of the load that have an increased thermal conductivity. The thermal conductivity is in particular greater than that of commercial plastic without fillers. Thus heat generated in the secondary winding, in particular in the secondary-side core, may be conducted out of the housing of the load for cooling. It is particularly favorable if these regions are arranged in such a way that the field lines of the inductive coupling substantially pass through these regions. Thus the contact surface required in any event for transmitting the power supply may be additionally utilized for cooling. Thus a compact structural dimension of the load is achievable.

In example embodiments, the preferably separate housing of the load has a housing part that forms a housing for the secondary winding. The housing part thus contains the receiving region for the contactless power supply. It is especially favorable if the housing part for the secondary winding is connected to the electric motor and a housing part of the electronic circuit, in particular detachably connected. This makes a modular construction of the load possible, in which a housing part especially developed for inductive power supply is provided on the load, if such an inductive power supply is desired, even subsequently. This simplifies the warehousing and manufacture of the load.

In example embodiments, the housing part for the secondary winding is made at least in regions from heat-conducting plastic, in particular from plastic having a fibrous, heat-conducting filler. It is advantageous in this regard that an inductive coupling through the housing is thereby made possible and that at the same time the interior may be cooled or such a cooling may at least be facilitated. The use of fibrous filler allows for the cooling to be directed.

In example embodiments, the housing part for the secondary winding is situated between the electric motor and the electronic circuit. Thus the housing part may be used to implement a heat barrier between the two sources of heat, the electric motor and the electronic circuit, for example a frequency converter, or a sensitive electronic circuit may be protected against the effect of heat from the electric motor.

In example embodiments, the housing part for the secondary winding is at least in regions made of a heat-conducting plastic. It is advantageous in this regard that heat from the secondary side of the inductive coupling in the interior may be dissipated to the environment through the housing part.

In example embodiments, the heat-conducting plastic of the housing part for the secondary winding contains heat-conducting fibers as filler, the heat-conducting fibers being oriented crosswise with respect to the direction of the connection between the electric motor and the electronic circuit. On the one hand, this prevents the exchange of heat between the electric motor and the electronic circuit, that is, it forms a heat barrier, while on the other hand allowing for a cooling of the secondary winding together with the core and of the electronic circuit required for drawing power, which includes at least one oscillating circuit and/or one rectifier.

In example embodiments, the housing part for the secondary winding is made of an aluminum cast body, ceramic platelets and/or plastic platelets, in particular heat-conducting plastic platelets, being embedded in the housing part in regions through which the field lines of the inductive coupling pass. A robust load having a contactless power supply of high efficiency is thus formed.

In example embodiments, the primary conductor includes a cable jacket that is made of a heat-conducting plastic. For example, plastics having a filler may be used advantageously, which contains metal powder, metallocene, graphite, metal particles of copper or aluminum, glass micro beads and/or plastic beads, in particular having a metal coating or metal vapor deposition, or a mixture of these substances. It is advantageous in this regard that the primary conductor may be utilized for cooling the load, in particular the coupling device. Additional ventilators or the like are dispensable. Because of the heat-conducting refinement of the primary conductor, the heat transfer resistance from the interior of the insertion part to a region of the primary conductor outside of the insertion part is smaller than the heat transfer resistance from the interior of the insertion part through the housing of the insertion part to the environment. The surface of the primary conductor thus forms a large cooling surface.

It is particularly favorable if the ferromagnetic region or the ferromagnetic core in the insertion part in the inserted position of the insertion part is connected to the core of the secondary winding in a heat-conducting manner, in particular by contact or via at least one heat-conducting region in the housing of the load and/or via at least one ceramic platelet and/or plastic platelet embedded in the housing part for the secondary winding. Thus, for cooling the secondary winding and in general the interior of the load, a path for the heat flow is formed whose heat transfer resistance between the heat source and the environment is lower than the heat transfer resistance in a heat flow through the housing wall. It is advantageous that there may be an at least additional cooling of a heat source in the interior of the load, for example of the heat generated by magnetic reversal in the secondary-side core, via the primary-side core and further via the primary conductor to the environment. The cooling is thus improved, and the service life and reliability of the load is increased.

In example embodiments, the section of the primary conductor enclosed by the insertion part is connected in a heat-conducting manner to the ferromagnetic region or the ferromagnetic core in the insertion part, in particular by contact and/or heat-conducting paste. The heat transfer resistance is thus further reduced. The heat-conducting paste may be applied when inserting the primary conductor and may be removed without residue when repositioning the insertion part along the primary conductor.

In example embodiments, an aperture is provided on the insertion part, which accommodates a securing element. The insertion part may thus be secured against insertion into or against removal from the recess. An operating switch for the load is thus dispensable even from a security perspective.

In example embodiments, the securing element is a lock, the shackle of which extends into or through the aperture. The aperture is advantageously implemented as a bore hole. It is particularly favorable if the lock secures the insertion part additionally against opening such that the primary conductor may be removed from the insertion part only when the lock is open. The refinement provides an inexpensive securing device.

In an advantageous refinement, the securing element is developed as a, in particular electrically operable, locking element on the load, in particular in the recess. The locking element is advantageously developed as a shiftable and/or rotatable bolt or latch or projection. It is advantageous that this allows for a remote control and/or electronic safeguard. Alternatively, an automatic engagement of the locking element after removal and/or after insertion of the insertion part is provided such that a reverse action, that is, the startup after a shutdown or the shutdown after a startup, requires a release or opening of the lock and that thus the load is secured against unauthorized or inadvertent modification.

Among features of example embodiments of the present invention in the system are that at least loads and insertion part are provided, the loads being powered in a contactless manner by a respective inductive coupling to one or multiple primary conductors. Advantageously, the load is constructed such that the primary conductor is removable from the load. In example embodiments, at least one subsection, in particular substantially any point, of the primary conductor is non-destructively usable, in particular reusable, as a tapping point for the inductive coupling of a load. This makes it possible to manufacture the power supply of a system of load to be particularly flexible and robust against environmental influences. The system may be reconfigured in a simple manner and by few measures. In particular, new loads may be readily integrated into the network of the contactless power supply.

In example embodiments, the tapping point is embraced by an insertion part that is detachably situated in a recess of the respective load. Thus the tapping point and consequently the associated section of the primary conductor may be readily brought into a defined operating position.

In example embodiments, the tapping point is shiftable along the primary conductor merely by taking the primary conductor out of the insertion part and repositioning the insertion part, in particular along the primary conductor. It is advantageous in this regard that the loads may be readily rearranged, while the cable routing of the primary conductor is preserved. In particular, taps for withdrawing power from the primary conductor are dispensable.

In example embodiments, at least one primary conductor is held in a force-locking or form-locking manner in the load, in particular by an insertion part.

In example embodiments, a load is situated on a movable part, in particular a turning table or linear drive, in particular the part being supported in a rotatable manner or being linearly movable.

In example embodiments, the primary conductor is powered by an AC/AC converter, i.e. alternating-current/alternating-current converter. Advantageously, it may thus be powered from the network at 50 or 60 Hz.

In example embodiments, the primary conductor has a medium-frequency alternating current applied to it. Advantageously, it may have current applied to it at approximately 10 to 50 kHz, in particular at approximately 20 kHz. Thus losses are kept low, in particular at high power outputs.

In example embodiments, the primary conductor powers the loads in series. Thus lines may be advantageously reduced.

Example embodiments provide for the primary conductor to be supplied with power in a contactless manner via stationary coil cores including at least one coil winding, or to be supplied with power via a contact wire. The advantage of this is that it allows for a movable setup of the primary conductor.

In example embodiments, the primary conductor is laid as a closed loop. The advantage of this is that a simple installation may be provided.

In example embodiments, the primary conductor and the load are galvanically decoupled. The advantage in this regard is that the system may be utilized in applications having high requirements with respect to explosion protection. It is furthermore advantageous that contact problems due to corroded or soiled contacts are avoidable. Additionally, the use of outward-pointing, voltage-carrying parts is thus avoidable.

Among features of example embodiments of the present invention in the method are that a load is connected to a system for contactless power supply, the system for contactless power supply including a primary conductor, a section of the primary conductor being inserted in a non-destructive manner into an opened insertion part in a first step, the insertion part being closed in a second step, and the insertion part being inserted into a recess of the load in a third step. It is advantageous in this regard that a simpler and more cost-effective wiring in electrical loads and systems is created.

In example embodiments, a locking occurs, in particular by snap-in connection, when closing the insertion part. It is advantageous in this regard that the primary conductor is securely held in the insertion part, especially prior to inserting the insertion part.

In example embodiments, the insertion part is inserted along a guide device, the guide device in particular effecting a secure snap-in in the final position. The advantage in this regard is that the insertion part is securely held in the housing, in particular following in the insertion of the insertion part, and that the insertion may be accomplished simply and quickly.

In example embodiments, the third step provides the inductive powering of the load. It is advantageous in this regard that further steps and measures such as, for example, the insertion of a ferromagnetic core for improving the coupling between primary conductor and secondary conductor is dispensable. Thus time is saved in providing the power supply. A complex mechanism for moving, possibly automatically, a ferromagnetic coupling element required according to conventional arrangements is thus dispensable.

In example embodiments, the contactless power supply occurs via an inductive coupling of the load to the section of the primary conductor inserted into the insertion part, the waste heat produced by the inductive coupling being dissipated to the environment at least partially through the inserted primary conductor. Thus a method of cooling a load via its power supply lines is described.

LIST OF REFERENCE CHARACTERS

1 Supply conductor as the primary conductor of the primary conductor system
2 Return conductor as the primary conductor of the primary conductor system
3 Insertion part
4 Load
5 Elevations
6 Bore
7 Bore
8 Bottom part
9 Top part
10 Grip surface
11 Elevation
12 Recess
13 Core
14 Lateral surface
15 Edge
16 Primary conductor section
17 Elevation
18 Recess
19 Emerging section of primary conductor
20 Motor
21 Gear unit
22 Frequency converter
23 Secondary coil insert
24 Bearing side A
25 Bearing side B
26 Locking bore
27 Cooling fins
28 Coupling region
29 Primary conductor section
30 Cooling surface
31 Cooling surface
32 Primary conductor elbow
33 Winding area
41 Power source
42 Load
43 Tapping point Example embodiments of the present invention are explained in greater detail with reference to the Figures.

BRIEF DESCRIPTION OF THE DRAWINGS

FIG. 3 illustrates an insertion part according to an example embodiment of the present invention in the open state, FIG. 4 is a schematic representation of a system of loads according to an example embodiment of the present invention, which are powered from a primary conductor.

DETAILED DESCRIPTION

Figure 1:
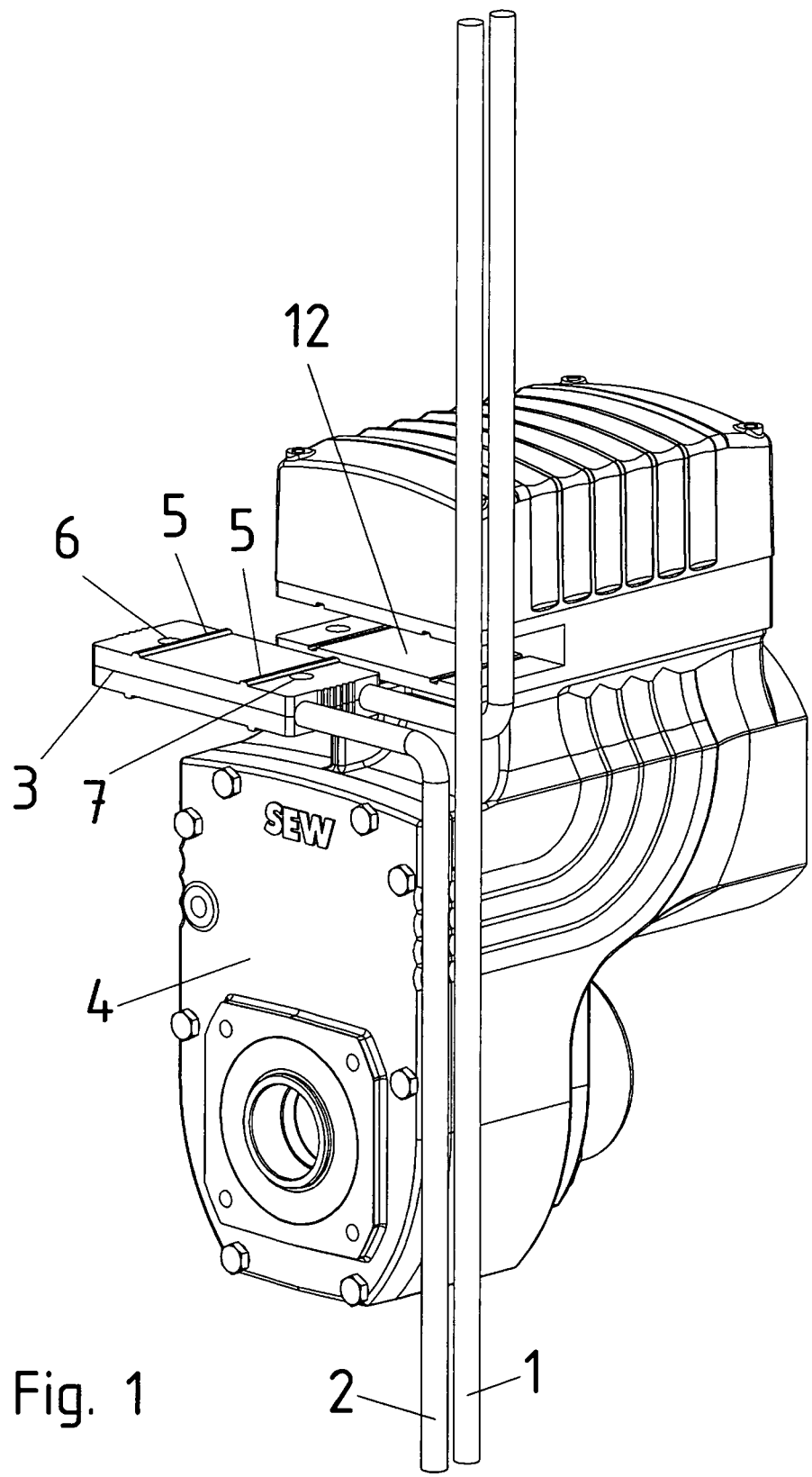
FIG. 1 illustrates a load according to an example embodiment of the present invention together with a primary conductor.

FIG. 4 schematically shows a system in which a power source 41 powers loads 4 in a contactless manner via supply conductor 1 and a return conductor 2. Loads 4 are respectively connected at a tapping point 43 on supply conductor 1 or return conductor 2, also jointly referred to as primary conductor, both conductors having equal status for the purpose of connection. The punctiform shape of tapping points 43 results from an abstraction of the system in the sense of a network. In any physical implementation of the system, the tapping point is a spatially delimited region, within which the physical interaction of the connection substantially occurs. The spatial extension of this region, that is, in particular the length of the section of primary conductor 1 or 2 involved in the interaction is substantially smaller than the overall spatial extension of the system, which forms the basis of the usefulness and justification of the abstraction of a point for the connection region. Any arbitrary section of primary conductor 1 or 2, whose length corresponds to the extension of the spatial region of the physical interaction of the connection, may be used as tapping point 43. Tapping points 43 in FIG. 4 are thus shiftable along the primary conductor. Since the connection is established in a non-destructive manner, as described below, the selection of a tapping point 43 is reversible, and another tapping point 43 may be subsequently selected in place of the initially selected tapping point 43.

In example embodiments, the primary conductors 1, 2 additionally have a high-frequency signal applied to them for transmitting data and commands. In this case, loads 4 include means for modulating and demodulating such data.

Figure 2:
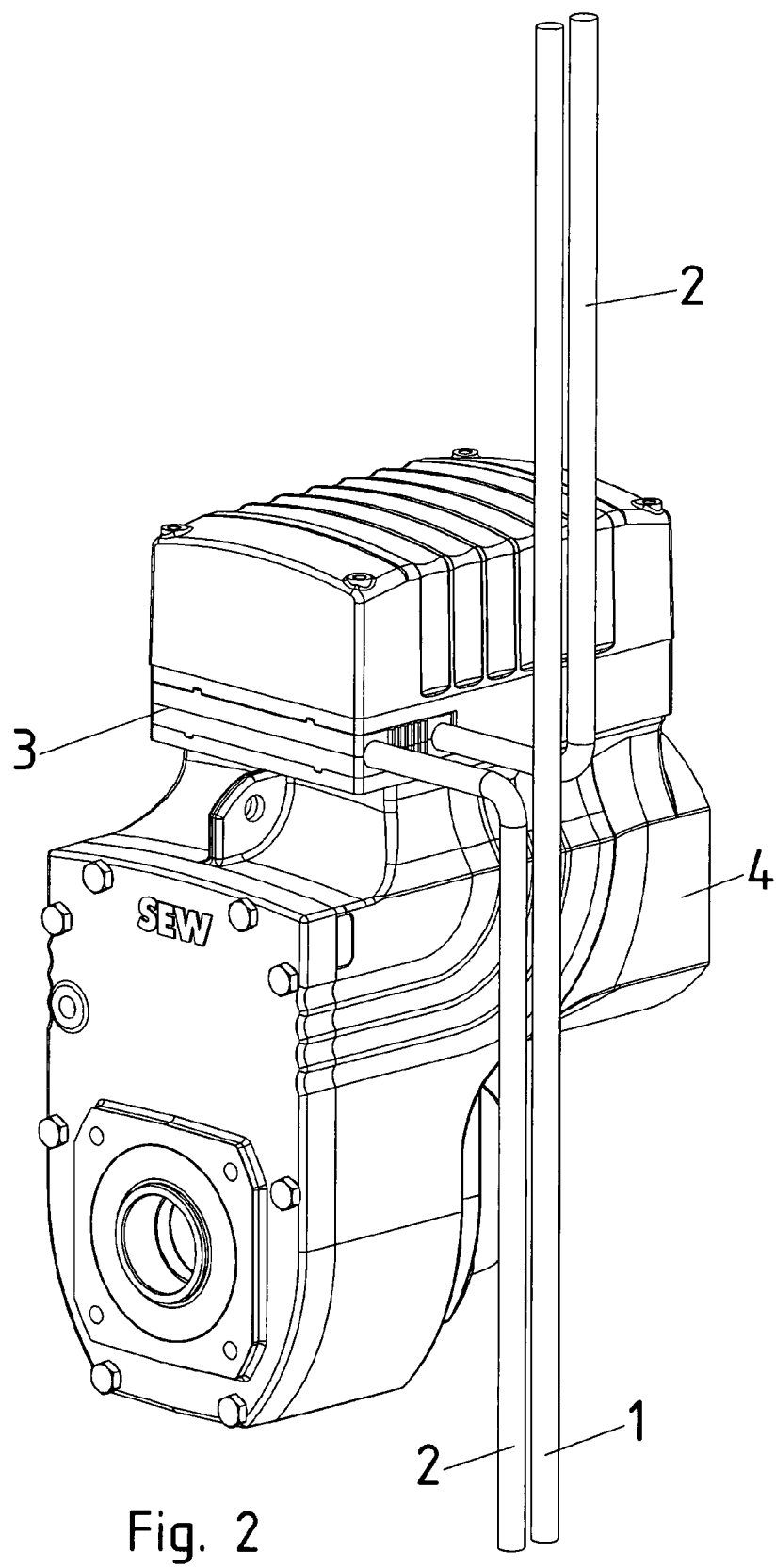
FIG. 2 illustrates the load according to an example embodiment of the present invention together with the primary conductor with the insertion part inserted.

FIG. 1 symbolically shows a load according to example embodiments of the present invention, the load being disconnected from the power supply. FIG. 2 symbolically shows a load according to example embodiments of the present invention including power supply.

The primary conductor system includes a supply conductor 1 and a return conductor 2, in which a medium-frequency alternating current is applied.

Load 4, taking the form of a geared inverter motor, includes a secondary coil, which, following the insertion of insertion part 3, is inductively coupled to the primary conductor system.

Insertion part 3 has elevations 5 for a form-locking connection to load 4 or at least as a guide when inserting insertion part 3. Bores 6, 7 are additionally provided. Insertion part 3 may be opened in particular for inserting the primary conductor, that is, supply conductor 1 or return conductor 2.

Using a bolt, which is insertable through bore 6 and also insertable into a bore of the load, it is possible to couple insertion part 3 to load 4 in a form-locking manner. For this purpose, a tool is required, and only operators having the tool are able to release the connection. Alternatively or additionally, the bolt inserted into bore 6 secures the insertion part against being opened.

When insertion part 3 has been taken out of the load, a padlock may be inserted by its shackle into bore 7. In this manner it is possible to block the reinsertion of the insertion part into the load.

Thus, only an authorized operator having a key for the lock of the padlock is able to restore the electrical power supply of the load.

The load has a U-core or an E-shaped core, which couples the secondary coil to the primary conductor system in an improved manner.

FIG. 3 shows insertion part 3 prior to insertion in the open state. The insertion part is made up of a top part 9 and a bottom part 8. Top part 9 and/or bottom part 8 have grip surfaces 10 which facilitate opening insertion part 3. For an improved grip, the grip surfaces are rippled.

The return conductor of primary conductor system 2 is inserted into open insertion part 3. Alternatively, the supply conductor of primary conductor system 1 is inserted. Elevations 11 and 17 are provided for guiding the inserted primary conductor.

Inserted primary conductor 2 is thus guided at least by elevations 11 and 17 and the wall of bottom part 8 in a U-shaped loop, which substantially forms a winding between emerging sections 19 of the primary conductor. This winding bounds a winding area 33 through which the generated magnetic field lines pass when current is flowing in the primary conductor.

Elevations 11 and 17 additionally form apertures in the form of respectively one bore, through which connection means, for example bolts, may be inserted for connecting top part 9 to bottom part 8.

As may be seen from FIG. 3, the loop of primary conductor 2 is formed in the assembled state of insertion part 3 also by the wall of top part 9.

After closing insertion part 3, that is, after setting top part 9 onto bottom part 8, insertion part 3 is arrested in the closed state by bolts inserted into bores 6 and 7.

In exemplary embodiments, more than one winding of primary conductor 2 are formed in insertion part 3, the respective winding areas being made to coincide such that the induced magnetic field adds up.

In exemplary embodiments, the top part and the bottom part have a hinged design.

In exemplary embodiments, the grip surfaces have a rubberized design.

In exemplary embodiments, an insertion or snap-in mechanism is provided for fixating the insertion part in the closed state.

In exemplary embodiments, recesses are introduced into the bottom and/or top part for accommodating and guiding the inserted primary conductor.

In exemplary embodiments, the insertion part is arrested by a snap-in device after it is closed, that is, after the top part and the bottom part are brought together.

In exemplary embodiments, the guide device additionally includes a device for snapping in and fixating the insertion part in the inserted final position.

FIG. 4 shows a schematic representation of a system of loads according to example embodiments of the present invention, which are powered from a primary conductor. For connecting the contactless power supply according to the aforementioned exemplary embodiments to a load 4, first a primary conductor 1 or 2 is inserted into an open insertion part 3, subsequently insertion part 3 is closed and preferably secured against opening, then insertion part 3 is inserted into the recess provided for this purpose in load 4, preferably along guide means in the form of elevations 5. A contactless supply of power to the load is thus established. Inserted primary conductor 1 or 2 remains undamaged and may be reused after removing insertion part 3. In particular, the tapping point of load 4, that is, the spatial position of insertion part 3 and of the section of the primary conductor substantially involved in the physical interaction of the inductive coupling in the above-described abstraction, may thus be shifted along primary conductor 1 or 2. For the section of the primary conductor inserted in insertion part 3 in FIG. 3 does not differ from the adjacent sections. Thus substantially all points of the primary conductor, that is, apart from distinguished regions such as the beginning and the end, are utilizable as tapping points.

In addition, a high protection class such as IP65 or IP66 or higher is achievable for the power supply because load 4 may be constructed to have a closed housing surface and yet be supplied with power.

Figure 3A:
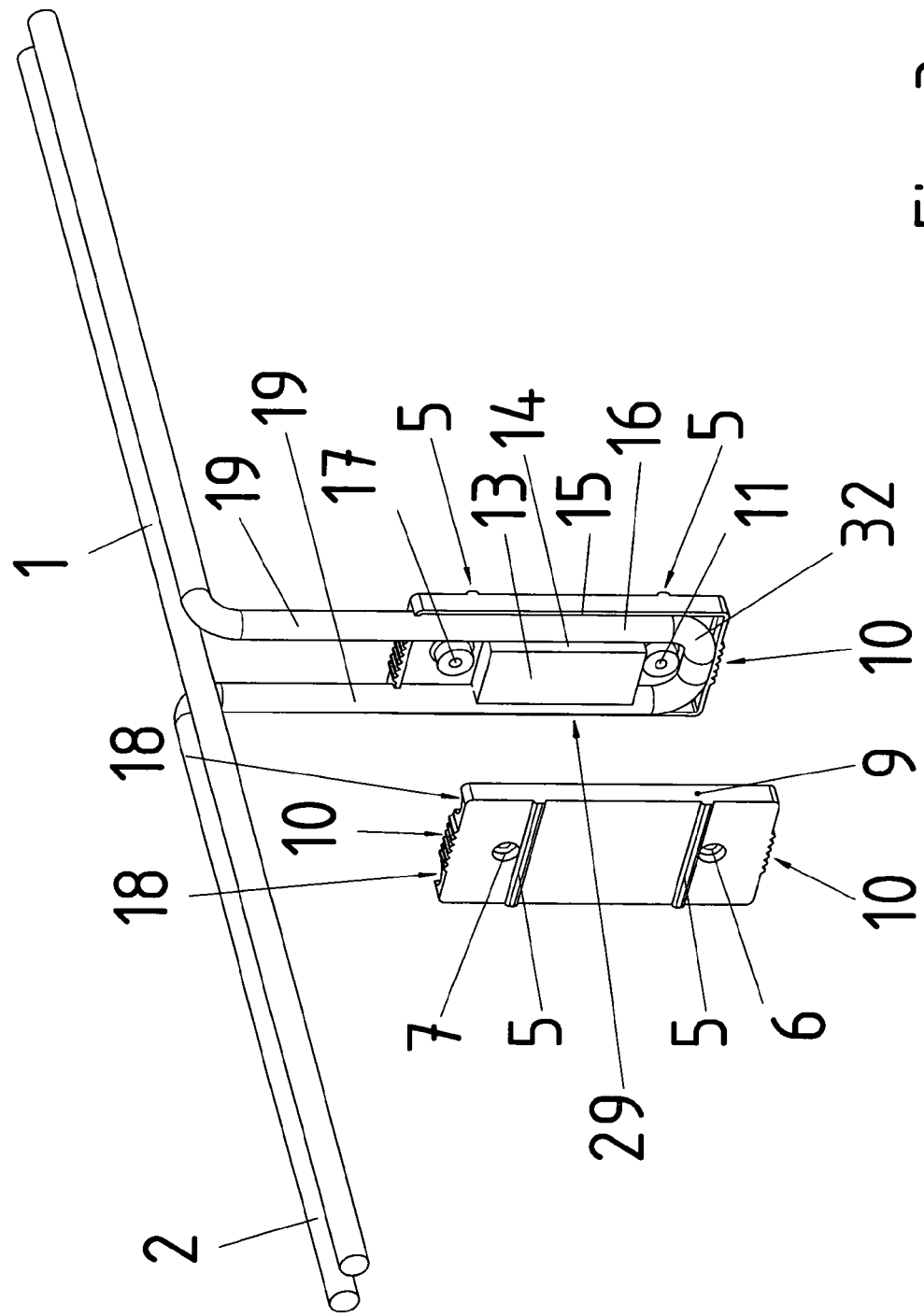
FIG. 3a illustrates an insertion part according to an example embodiment of the present invention in the open state having a ferromagnetic core.

FIG. 3a shows another insertion part 3 according to example embodiments of the present invention. In contrast to insertion part 3 as shown in FIG. 3, in this case a ferromagnetic core 13 is inserted into winding area 33. The insertion part as shown in FIG. 3a is thus developed as an optional variant of the insertion part as shown in FIG. 3. Thus the magnetic field generated by a primary conductor current and passing through winding area 33 is amplified compared to the conditions in FIG. 3.

Ferromagnetic core 13 is detachably connected to bottom part 8 of insertion part 3 and inserted into a receptacle that retains in a force-locking manner. Together with the brim-like shaped edge 15 of bottom part 8, lateral surface 14 of the block-shaped ferromagnetic core 13 forms a straight cable duct into which a section 16 of primary conductor 2 is inserted. Primary conductor section 16 thus abuts both on edge 15 as well as on lateral surface 14 of the ferromagnetic core. Together with peripheral edge 15, the lateral surface of the ferromagnetic core lying across from lateral surface 14 forms a similar cable duct, into which a primary conductor section 29 is likewise inserted. A section between straight primary conductor sections 16, 29 extends around an elevation 11 and thus forms a primary conductor elbow 32.

In exemplary embodiments, ferromagnetic core 13 is cast into the plastic material of insertion part 3, or regions are formed in the plastic material, in which the plastic contains a ferromagnetic filler.

Primary conductor section 16, primary conductor elbow 32 and primary conductor 29 in FIG. 3a thus form a winding between emerging primary conductor sections 19. Except for the portion between emerging primary conductor sections 19, the winding forms nearly a full turn.

Top part 9 and bottom part 8 are developed identically.

Recesses 18 are provided in the edge of bottom part 8 and in the edge of top part 9, through which primary conductor 2 is run into and out of insertion part 3 at the emerging sections of the primary conductor.

In exemplary embodiments, primary conductors 1, 2 have an insolating layer that is made of heat-conducting plastic. In particular, this insulating layer is designed to be at least dual-layered and includes an inner layer made of a braided tube of glass fibers or a mixture of glass fibers and plastic fiber or another flexible support material and a second layer of a silicone resin and/or a silicone rubber having a heat-conducting filler. Because of the contact between primary conductor section 16 and lateral surface 14 of ferromagnetic core 13, a good heat contact having a low heat transfer resistance is established, and primary conductor 2 is able to take up heat from ferromagnetic core 13 and conduct it through recesses 18 out of insertion part 3. Thus insertion part 3 is cooled by primary conductor 2. This heat contact may be improved by introducing heat-conducting paste into the previously described cable ducts. When repositioning insertion part 3 along primary conductor 2, the heat-conducting paste may be easily wiped off the primary conductor and applied again at a new location.

Figure 5:
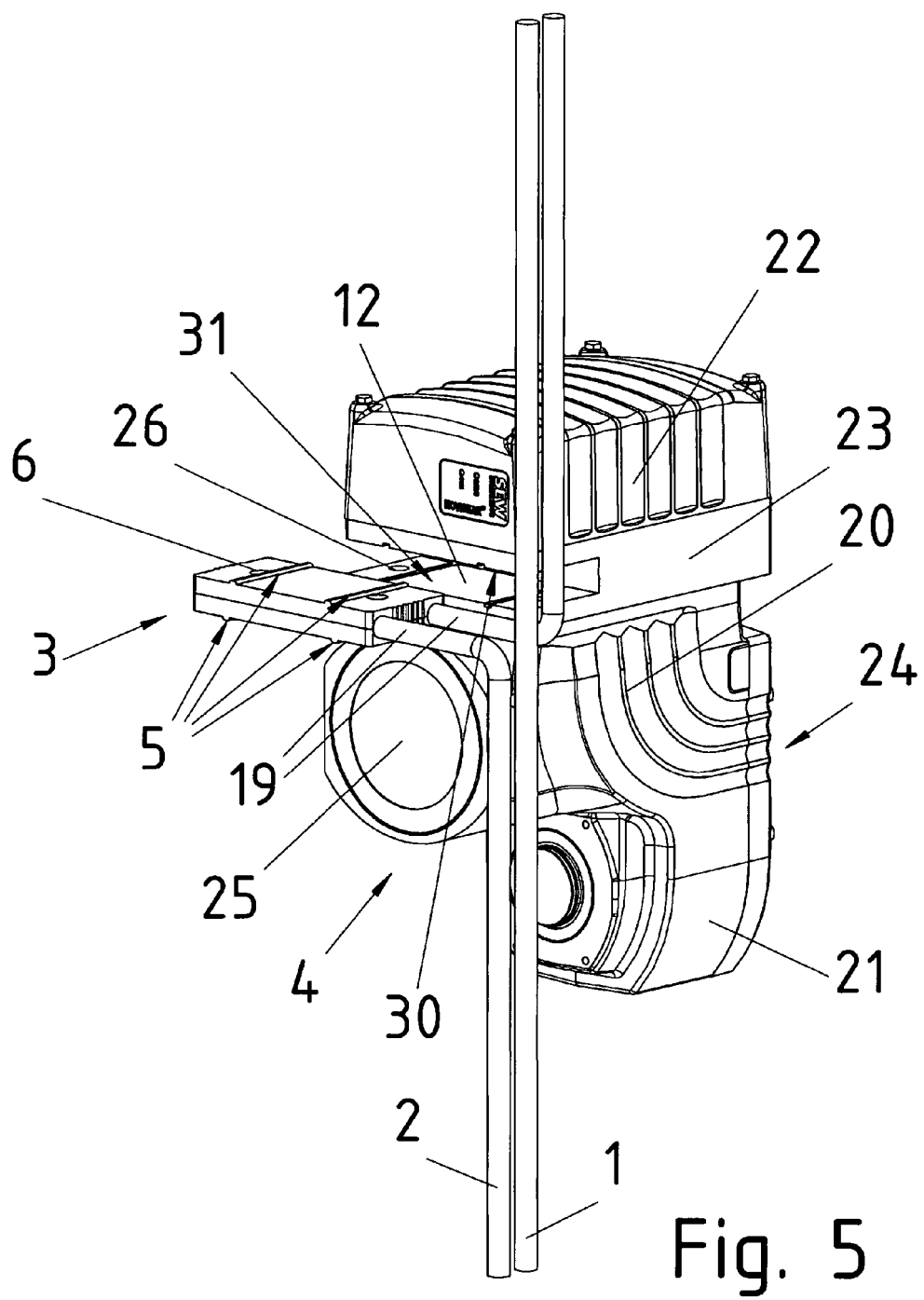
FIG. 5 illustrates another load according to an example embodiment of the present invention together with a primary conductor and an insertion part and FIG. 6 illustrates the load according to an example embodiment of the present invention from FIG. 5 with the insertion part inserted.

FIG. 5 shows an exemplary embodiment of a load. The load, generally indicated by 4, includes a motor 20, a gear unit 21 and a frequency converter 22 and thus forms a compact drive unit. Motor 20 and gear unit 21 are situated and supported in a common housing made of cast aluminum. Frequency converter 2 is enclosed by a cap which forms a housing and is likewise made of aluminum.

Motor 20, gear unit 21 and frequency converter 22 are developed as in load 4.

A secondary coil insert 23 is disposed between frequency converter 22 and motor 20. Secondary coil insert 23 encloses in a housing-forming manner a secondary winding (not shown) and an electronic circuit, which in turn includes at least one resonant oscillating circuit and/or a rectifier stage.

A recess 12 is formed on secondary coil insert 23, into which an insertion part 3 may be inserted. Insertion part 3 has guide elements in the form of elevations 5 running in a rib-like manner, which engage into corresponding grooves introduced into surfaces of the housing wall of secondary coil insert 23, whereby an insertion of insertion part 3 is guided.

In contrast to the exemplary embodiment shown in FIGS. 1 and 2, recess 12 in the secondary coil insert is oriented towards bearing side B 25 of motor 20. Thus sufficient free space is created on bearing side A 24, on which the drive shaft of gear unit 21 is also provided to emerge, for a compact attachment of the drive unit to a system or device.

Flat cooling surfaces 30 and 31 are developed in recess 12, which contact corresponding surfaces on insertion part 3 in the inserted state. Thus, not only is insertion part 3 securely held in the recess, but additionally a good heat contact is established, that is, a head bridge having a low heat transfer resistance, between the interior of secondary coil insert 23, in particular the secondary winding and/or an electronic circuit, and insertion part 3. It is thus possible to cool the interior of secondary coil insert 23 through insertion part 3 and further through the emerging sections 19 of primary conductor 2.

Secondary coil insert 23 is made of plastic at least in regions or entirely and thus forms a heat barrier between motor 20 and the electronic circuit, frequency converter 22.

In exemplary embodiments, the plastic contains a heat-conducting filler in the form of carbon fibers. The carbon fibers are oriented crosswise with respect to the connecting line between motor 20 and frequency converter 22, which results in an increased thermal conductivity crosswise to this connecting line. There is thus no increased exchange of heat between motor 20 and frequency converter 22, but rather heat is increasingly conducted away from the region of recess 12.

In exemplary embodiments, secondary coil insert 23 is made of a ceramic material.

In exemplary embodiments, secondary coil insert is made of aluminum and has openings in cooling surfaces 30, 31, into which ceramic platelets or plastic platelets are inserted, whereby these openings are closed tightly. The openings are dimensioned in such a way that the essential portion of the magnetic field lines generated by the winding in the insertion part in the inserted state passes through the openings and not through the aluminum housing of secondary coil insert 23. The openings thus enclose an area that essentially equals winding area 33 and covers the latter. The magnetic field lines generated by winding 33 are bundled and conducted into the interior of secondary coil insert 23. This bundling is amplified by a core arrangement in the interior of secondary coil insert 23. Particularly a U-shaped core in the interior of secondary coil insert 23 has the effect that the magnetic field lines enter through a cooling surface 30, 31 into secondary coil insert 23 and exit again through the other cooling surface 30, 31, substantially no stray field passing through the aluminum housing. Thus, eddy current losses are avoided.

Figure 6:
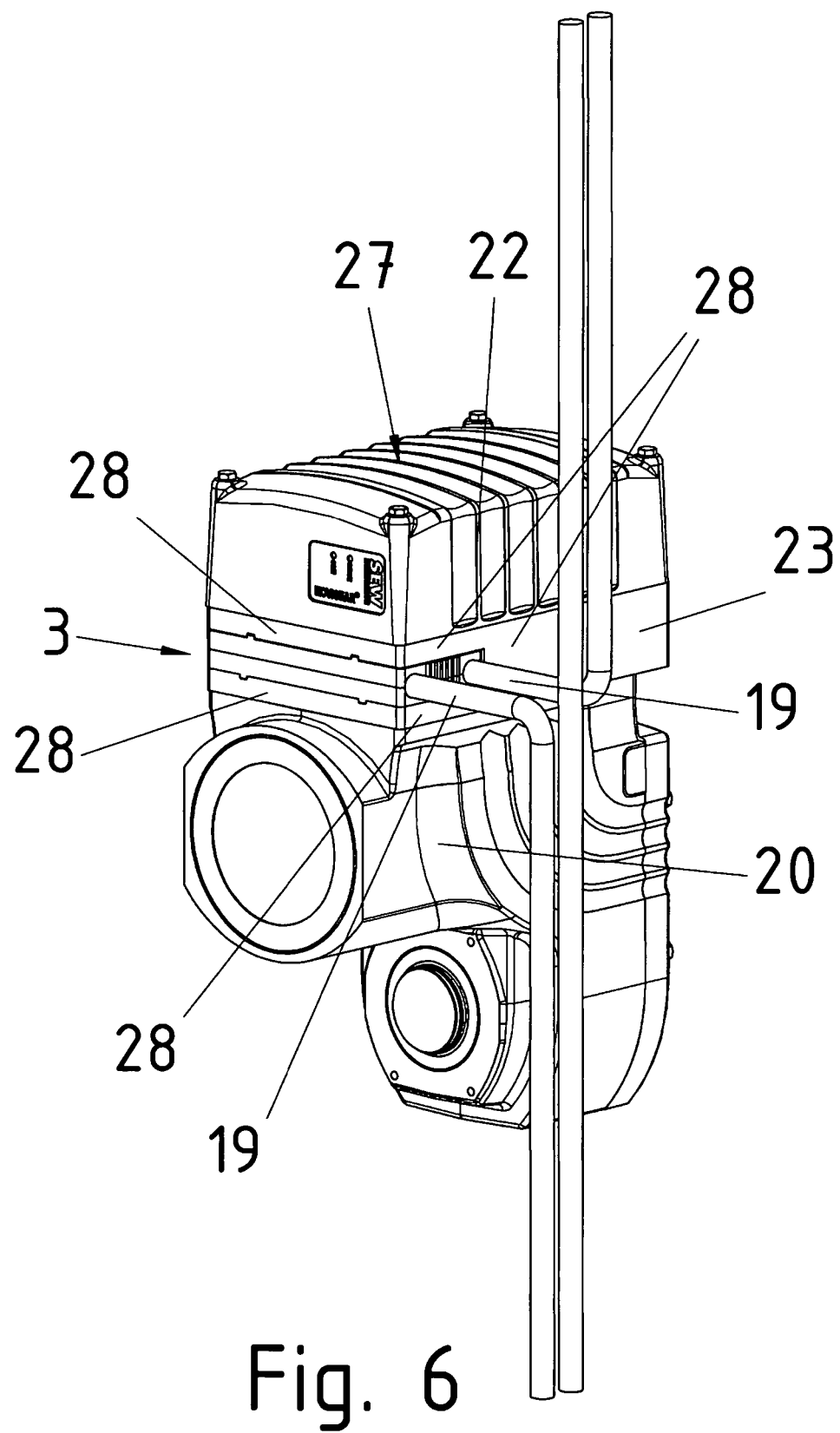

FIG. 6 shows the drive unit from FIG. 5 with insertion part 3 inserted into recess 12. In immediate proximity to recess 12, a ferromagnetic core is situated in the interior of secondary coil insert 23, which embraces the recess in the coupling regions 28 in a U-shaped manner.

In exemplary embodiments, a secondary winding is inserted into a flat, planar core on one or on both cooling surfaces 30, 31.

Motor 20 is cooled through its housing, which it shares with the gear unit, while frequency converter 22 is cooled through the cap having cooling ribs 27 that surrounds it by forming a housing. The heat generated in the interior of secondary coil insert 23, in particular by the inductive coupling and/or by the electronic influencing of the induced signal, is dissipated into insertion part 3, however, preferably into ferromagnetic core 13 in the interior of insertion part 3, and from there is dissipated into primary conductor 2 and via the emerging sections 19 of the primary conductor into the environment. For this purpose, primary conductor 1, 2 forms enough surface over its entire length, via which the heat may be dissipated into the environment.

In exemplary embodiments, the ferromagnetic core of the insertion part has an E-shaped design.

In exemplary embodiments, the ferromagnetic core partially extends through the housing of the insertion part and thus forms a contact surface on the insertion part. This contact surface is situated in the outer surface of the insertion part such that in the inserted state it comes into contact with at least one cooling surface 30, 31 in recess 12 of secondary coil insert 23.

In exemplary embodiments, the ferromagnetic core in secondary coil insert 23 is encapsulated with the housing and forms a region on the outer surface of the recess, in particular in the cooling regions 30 and 31, which may be brought into planar contact with the ferromagnetic core of insertion part 3.

The present invention relates to a load having a device for its inductive power supply, the device including an insertion part, the power supply of the load being provided after the insertion part is inserted into the load.

What is claimed is:

1. An electrical load, comprising:
a device adapted to be inductively powered from a primary conductor, the device including an insertion part detachably connected to the load and, in a connected state, inductively powers the load from the primary conductor, the insertion part configured to detachably accommodate a section of the primary conductor.

2. An electrical load, comprising:
a housing part adapted to form a housing for an electric motor, a gear unit, and an electric circuit adapted to power the electric motor, a rotor shaft of the electric motor and a drive shaft of the gear unit being supported in the housing part, a receiving region being provided that includes a secondary winding for a contactless supply of power, an insertion part being insertable into the receiving region, the insertion part detachably embracing a primary conductor at least partially;
wherein an inductive coupling between the primary conductor and the secondary winding being producible by insertion of the insertion part.

3. The load according to claim 2, wherein a recess is formed on the housing of the load and the detachable connection of the insertion part to the load is produced by insertion of the insertion part into the recess.

4. The load according to claim 2, wherein the insertion part is connectable to the load in at least one of (a) form lockingly, (b) force lockingly, and (c) by a clamping connection.

5. The load according to claim 2, wherein the insertion part forms a housing for the primary conductor at least partially.

6. The load according to claim 2, wherein the insertion part is openable and closable for insertion and removal of the primary conductor.

7. The load according to claim 2, wherein a section of the primary conductor for the inductive power supply is shiftable along the primary conductor by opening, repositioning, and closing the insertion part.

8. The load according to claim 2, wherein the insertion part includes at least two subsections that are connectable in a detachable manner.

9. The load according to claim 8, wherein the two subsections are configured variably in relative spatial position with respect to each other.

10. The load according to claim 2, wherein the primary conductor is electrically insulated against the load.

11. The load according to claim 2, wherein the insertion part is made by at least one of (a) injection molding and (b) plastic injection molding.

12. The load according to claim 2, wherein the insertion part is made of at least one of (a) heat-conducting plastic and (b) a polymer matrix material having at least one of (i) a fibrous and (ii) a non-fibrous heat-conducting filler.

13. The load according to claim 2, wherein a primary conductor is situated on the load such that an inductive coupling to a secondary winding contained in the load is established.

14. The load according to claim 1, wherein the device for the inductive power supply include a secondary winding arranged in a housing of the load.

15. The load according to claim 2, wherein the secondary winding is wound around a ferromagnetic core and the ferromagnetic core has legs that partially embrace a recess in the housing.

16. The load according to claim 15, wherein the ferromagnetic core of the secondary winding partially forms a housing for the load.

17. The load according to claim 1, wherein the load is arranged as a drive that includes an electric motor and an electronic circuit adapted to power the electric motor.

18. The load according to claim 1, wherein the load has a housing part adapted to form a housing for an electric motor, a gear unit, and an electronic circuit, including frequency converter, adapted to power the electric motor, a rotor shaft of the electric motor and a drive shaft of the gear unit being supported in the housing part and the insertion part being insertable into a receiving region of the housing part.

19. The load according to claim 2, wherein at least one secondary winding is at least one of (a) wound around at least one of (i) a U-shaped and (ii) an E-shaped core and (b) is wound in a flat core.

20. The load according to claim 2, wherein the load at least one of (a) is impervious, (b) is smooth on an outer surface, and (c) provides a high degree of protection for use in at least one of (i) wet areas and (ii) aseptic areas.

21. The load according to claim 2, wherein the load includes no plug-and-socket connector or other electrical connection terminals on an exterior.

22. The load according to claim 2, wherein the insertion part includes a guide device adapted to guide the primary conductor.

23. The load according to claim 2, wherein at least one of (a) a ferromagnetic region is provided on the insertion part and (b) the insertion part includes a ferromagnetic core.

24. The load according to claim 23, wherein the ferromagnetic core is connected to the insertion part in a detachable manner.

25. The load according to claim 23, wherein the ferromagnetic core is integrally cast in the insertion part.

26. The load according to claim 23, wherein at least one of (a) the ferromagnetic core partially forms a housing for the insertion part and (b) a region of the ferromagnetic core forms an outer surface of the insertion part.

27. The load according to claim 23, wherein the primary conductor inserted into the insertion part forms at least one of (a) a loop and (b) a winding and the ferromagnetic core of the secondary winding covers the one of (a) the loop and (b) the winding.

28. The load according to claim 23, wherein the primary conductor inserted into the insertion part forms at least one of (a) a loop and (b) a winding that bounds an area, and at least one of (a) the ferromagnetic region and (b) the ferromagnetic core is arranged in the area.

29. The load according to claim 2, wherein a recess is partially formed by regions in the housing of the load that have an increased thermal conductivity, and field lines of the inductive coupling substantially pass through the regions.

30. The load according to claim 2, wherein the housing of the load has a housing part that forms a housing for the secondary winding.

31. The load according to claim 30, wherein the housing part for the secondary winding is made at least in regions from at least one of (a) heat-conducting plastic and (b) plastic having fibrous, heat-conducting plastic.

32. The load according to claim 30, wherein the housing part for the secondary winding is arranged between the electric motor and the electric circuit.

33. The load according to claim 30, wherein the housing part for the secondary winding is at least one of (a) connected and (b) detachably connected to the electric motor and a housing part of the electric circuit.

34. The load according to claim 30, wherein the housing part for the secondary winding is made at least in regions from a heat-conducting plastic.

35. The load according to claim 34, wherein the heat-conducting plastic of the housing part for the secondary winding includes heat-conducting fibers as a filler, the heat-conducting fibers being oriented crosswise with respect to a connection direction between the electric motor and the electric circuit.

36. The load according to claim 30, wherein the housing part for the secondary winding is made of an aluminum cast body, and at least one of (a) ceramic platelets, (b) plastic platelets, and (c) heat-conducting plastic platelets are embedded in the housing part in regions through which field lines of the inductive coupling pass.

37. The load according to claim 2, wherein the primary conductor is made of a heat-conducting plastic.

38. The load according to claim 2, wherein the primary conductor includes a cable jacket that is made of a heat-conducting plastic.

39. The load according to claim 23, wherein at least one of (a) the ferromagnetic region and (b) the ferromagnetic core, in an inserted position of the insertion part, is connected to a core of the secondary winding at least one of (a) in a heat-conducting manner, (b) by contact, (c) via at least one heat-conducting region in the housing of the load, and (d) via at least one of (i) a ceramic platelet and (ii) a plastic platelet embedded in the housing part for the secondary winding.

40. The load according to claim 23, wherein a section of the primary conductor enclosed by the insertion part is connected in a heat-conducting manner to at least one of (a) the ferromagnetic region and (b) the ferromagnetic core in the insertion part by at least one of (a) contact and (b) heat-conducting paste.

41. The load according to claim 2, wherein an aperture is provided on the insertion part to accommodate a securing element.

42. The load according to claim 41, wherein the securing element is a lock, a shackle of the lock extending at least one of (a) into and (b) through the aperture.

43. The load according to claim 41, wherein the securing element is arranged as an electrically operable locking element on the load.

44. A system, comprising:
at least loads and insertion parts, the loads being powerable in a contactless manner by a respective inductive coupling to at least one primary conductors, at least one subsection of the primary conductor detachably arranged in the insertion part, the load arranged such that the primary conductor is detachable from the load.

45. The system according to claim 44, wherein the at least one subsection of the primary conductor is at least one of (a) detachably and (b) non-destructively arranged as a tapping point for an inductive coupling of a load.

46. The system according to claim 45, wherein the tapping point is embraced by an insertion part that is removably situated in a recess of a respective load.

47. The system according to claim 45, wherein the tapping point is shiftable along the primary conductor by taking the primary conductor out of the insertion part, repositioning the insertion part, and inserting the primary conductor into the insertion part.

48. The system according to claim 44, wherein at least one primary conductor is retained at least one of (a) force-lockingly and (b) form-lockingly in the load by an insertion part.

49. The system according to claim 44, wherein the primary conductor is powered by an AC/AC converter from a network at at least one of (a) 50 and (b) 60 Hz.

50. The system according to claim 44, wherein the primary conductor has medium-frequency alternating current applied of at least one of (a) approximately 10 to 50 kHz and (b) approximately 20 kHz.

51. The system according to claim 44, wherein the primary conductor has alternating current applied to it at a substantially constant amplitude of at least one of (a) at least 10 amperes and (b) at least 60 amperes.

52. The system according to claim 44, wherein the primary conductor is adapted to power the loads in series.

53. The system according to claim 44, wherein the primary conductor and the load are galvanically decoupled.

54. A method for connecting a load to a system for a contactless supply of power, the system for the contactless supply of power including a primary conductor, comprising:
non-destructively and detachably inserting a section of the primary conductor into an open insertion part;
closing the insertion part; and
inserting the insertion part into a recess of the load.

55. The method according to claim 54, wherein when closing the insertion part a locking occurs by a snap-in connection.

56. The method according to claim 54, wherein the insertion of the insertion part occurs along a guide device that brings about a secure snap-in in a final position.

57. The method according to claim 54, wherein the inserting provides the contactless supply of power to the load.

58. The method according to claim 54, wherein the contactless power supply occurs by an inductive coupling of the load to the section of the primary conductor inserted into the insertion part, waste heat produced by the inductive coupling being dissipated to the environment at least partially through the inserted primary conductor.

* * * * *